United States Patent [19]
Kelleher et al.

[11] 3,905,784
[45] Sept. 16, 1975

[54] METHOD FOR REMOVING POLLUTANTS FROM COMBUSTION PRODUCTS GENERATED BY HYDROCARBON FUEL COMBUSTION, AND SYSTEM THEREFOR

[75] Inventors: Raymond L. Kelleher; Ivan A. Shirk; Timothy J. O'Leary, all of Spokane, Wash.

[73] Assignee: The Corporation of Gonzaga University, Spokane, Wash.

[22] Filed: June 29, 1971

[21] Appl. No.: 157,952

Related U.S. Application Data

[63] Continuation-in-part of Ser. No. 788,460, Jan. 2, 1969, abandoned.

[52] U.S. Cl. ............................. 55/31; 55/68; 55/73; 210/50
[51] Int. Cl.² ................... B01D 53/04; B01D 53/00
[58] Field of Search ........... 55/9, 11, 68, 73, 75, 76, 55/80, 179, 180, 316, 29–33; 62/18; 210/50

[56] References Cited
UNITED STATES PATENTS

| | | | |
|---|---|---|---|
| 1,810,312 | 6/1931 | Hasche | 55/35 |
| 2,863,732 | 12/1958 | Bowers et al. | 210/50 |
| 3,100,146 | 8/1963 | Huntington | 55/9 |
| 3,406,501 | 10/1968 | Watkins | 55/316 |

*Primary Examiner*—Charles N. Hart
*Attorney, Agent, or Firm*—Graybeal, Barnard, Uhlir & Hughes

[57] ABSTRACT

Pollutant removal from industrial exhaust gases such as combustion products generated by combustion of hydrocarbon fuels, such pollutant removal being characterized by refrigerating the products of combustion to remove most of the pollutants as a liquid phase. Pollutants thus removed include the water formed by the combustion process, together with those pollutants having a substantial solubility in the water in liquid phase. Precooling of the hot combustion products to about ambient temperature is highly desirable to reduce energy requirements in the refrigerating stage or stages. Single or plural stages of refrigeration and liquid phase separation are employed. Water soluble pollutants formed during the hydrocarbon fuel combustion process include formaldehyde and formic acid (which are also describable as water affinitive in the sense of forming azeotropic mixtures with the condensed water), and also hydrogen sulfide, sulfur dioxide, oxides of nitrogen, quinoline bases, and pyridine bases, for example. The pollutants removed by combining with the water condensed from the combustion products can be chemically or physically treated to neutralize and/or extract the pollutants from the water so that the resulting liquid can be discharged to the environment essentially pollutant-free. The water insoluble pollutants such as carbon monoxide which are not removed from the gaseous phase by refrigeration can be largely removed by passing the exhaust gases, after removal of the water and water soluble pollutants therefrom, through adsorber means or the like, such as a molecular sieve. By reason of the removal of the water and water soluble pollutants prior to passing of the gaseous phase through the adsorber means, the effective life of the adsorber means is increased by factor of at least 20 to 1.

13 Claims, 2 Drawing Figures

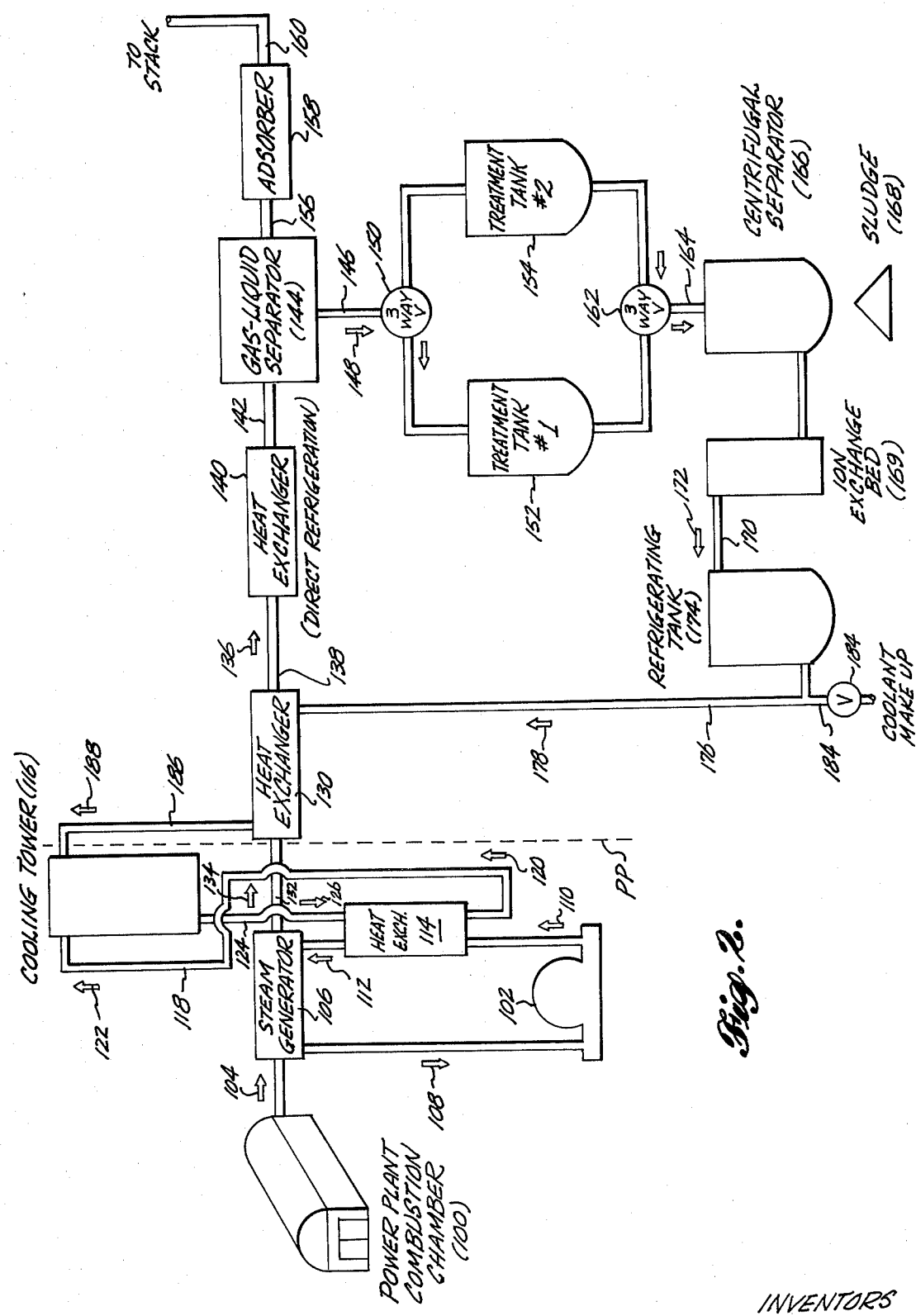

METHOD FOR REMOVING POLLUTANTS FROM COMBUSTION PRODUCTS GENERATED BY HYDROCARBON FUEL COMBUSTION, AND SYSTEM THEREFOR

CROSS-REFERENCE TO RELATED APPLICATION

This application is a continuation-in-part of our now abandoned application Ser. No. 788,460, entitled Method For Removing Pollutants From Industrial Exhaust Gases And The Like, filed Jan. 2, 1969.

BACKGROUND OF THE INVENTION

1. Field of the Invention

This invention relates to a method and system for removing pollutants from industrial exhaust gases such as the combustion products generated by combustion of hydrocarbon fuels.

2. Description of the Prior Art

The burning of commercial hydrocarbon fuels such as fuel oil, gasoline, and natural gas in atmospheric air is known to generate various gaseous products of combustion, which include carbon dioxide and water as the principal products of combustion, and also include material amounts (also termable trace amounts) of various pollutants such as formaldehyde, formic acid, hydrogen sulfide, sulfur dioxide, certain oxides of nitrogen, certain organic nitrogen such as quinoline bases and pyridine bases, and carbon monoxide. Some of these pollutants are of the nuisance type from the point of view of having a noxious odor, such as hydrogen sulfide and sulfur dioxide. Other pollutants are known to be detrimental to health, being highly toxic to humans and vegetation, such as formaldehyde, formic acid and nitrogen oxides (commonly generically termed $NO_x$).

Operation of hydrocarbon fuel fired energy generating plants, such as stationary power plants, have heretofore commonly involved emission of formed pollutants directly into the atmosphere with little or no pollutant removal except by usage of electrostatic precipitators and/or water scrubbers to remove solid particles and some pollutants from the exhaust. Various systems for reducing the emission of pollutants into the atmosphere have been proposed; however, in general these systems have involved high cost, making them prohibitive for industrial applications where large quantities of hydrocarbon fuel combustion products are produced, and these proposals have involved removal of only a few of the pollutants.

Removal of certain nitrogen oxides from internal combustion engine exhaust gases by reaction thereof with certain alumino silicates is disclosed by Brennan U.S. Pat. No. 3,015,369. Purification of diesel engine exhaust gases by weakly alkaline treatment and passage of the gases through an inert aggregate bed is disclosed by Bagley et al. U.S. Pat. No. 2,789,032.

Reduction of CO content in internal combustion engine exhaust gases by pre-treatment of the hydrocarbon fuel involving filtering of the fuel through a bentonite and trisodium phosphate filter is disclosed by Holland U.S. Pat. No. 2,930,751.

Huntington U.S. Pat. No. 3,100,146 discloses apparatus for removing objectionable pollutants from auto and truck exhaust, wherein the exhaust gases are cooled to about 200°F. then passed through an adsorbant silicate gel coated glass fiber cartridge. The 200°F. temperature of the gases would be ineffective to remove any substantial amounts of the water or water soluble pollutants in liquid phase, and subjection of the adsorbant cartridge to large amounts of water vapor would inherently dictate that the adsorbant cartridge would have a very short useful life.

Stowens U.S. Pat. No. 2,966,036 discloses another system for processing of internal combustion engine products of combustion involving superatmospheric pressurization of the products of combustion to a pressure of about 150 psi for example, cooling of the presurized gas to approximately ambient atmospheric temperature, and venting the cooled gases through an expansion chamber, which system with its requirement of substantial superatmospheric pressurization of the exhaust gases, involves extensive energy loss and is needlessly cumbersome.

Also known are systems for removing water vapor from compressed air, as disclosed in Adams U.S. Pat. No. 3,292,346 and Wachsmuth U.S. Pat. No. 3,225,517, which systems of course operate at superatmospheric pressure and are not concerned with treatment of condensed pollutant containing water for removal of the pollutants.

Also known is a system for recovery of sulfur dioxide from smelter furnace gases by refrigeration and liquefaction under pressure, as disclosed in Hasche U.S. Pat. No. 1,810,312. the purpose of the Hasche system is to recover purified sulfur dioxide from the effluent (containing about 10% sulfur dioxide for example), and not to render the effluent gases pollutant-free. Hasche separates sulfur dioxide from the smelter gaseous effluent by anhydrous liquefaction of the sulfur dioxide at about −70°C. and about 15 atmospheres pressure, the use of pressurization in the system being to reduce the refrigeration requirement dictated by the necessity for anhydrous sulfur dioxide liquefaction. In contrast, the treatment process of the present invention operates at substantially atmospheric pressure and the trace amount of sulfur dioxide present in the hydrocarbon fuel products of combustion is removed in the form of sulphurous acid, i.e., by taking advantage of the water solubility of the trace amount of sulfur dioxide in the condensed water. In the Hasche system the water vapor is removed prior to the sulfur dioxide liquefaction, i.e., the sulfur dioxide in liquid phase appears in this system under essentially anhydrous conditions because the refrigeration necessary for the sulfur dioxide liquefaction is at a temperature (−70°C.) far below the freezing temperature of water.

SUMMARY OF THE INVENTION

In the field of removal of pollutants from hydrocarbon fuel combustion products, prior systems have not maximized water removal and removal of water soluble pollutants preliminary to discharge of the effluent gases. In the instances of prior systems utilizing electrostatic precipitators or water scrubbers, these systems do not materially diminish the amount of aqueous constituents of the gases or reduce the aqueous content of the gases beyond the removal inherent by reason of cooling of the gases to ambient temperature or above. Experimentation has shown that the effectiveness of pollutant removal, in terms of removal of water and water soluble pollutants from the hydrocarbon fuel combustion products, can be increased several fold by refrigeration of the products of combustion to substantially water freezing temperature, i.e., to about 35°F., at substantially atmospheric pressure.

Large quantities of water are produced during combustion of hydrocarbon fuels. For example, it is estimated that about 2.25 pounds of water are produced per pound of natural gas burned, and about 1.4 pounds of water are produced per pound of gasoline or fuel oil burned. Recent studies have indicated that the discharge of large quantities of water and water soluble pollutants into the atmosphere in gaseous phase may adversely affect weather conditions in areas remote from the place of discharge. Further, certain toxic pollutants such as formaldehyde and formic acid form azeotropic mixtures with the atmospheric water, thus increasing the toxicity of the atmosphere. The effect of certain oxides of nitrogen discharged to the atmosphere is presently under extensive study and is also believed to contribute to atmosphere toxicity.

Practice of the present invention involves removing pollutants from hydrocarbon fuel combustion products by converting most of the contained water and water soluble pollutants to liquid phase by refrigeration of the combustion products near freezing temperature, i.e., about 35°F. In addition, the water insoluble pollutants remaining in the resulting dewatered exhaust gases are then also removed, as by adsorber means or the like, the efficiency and useful life of such adsorber means or the like being markedly improved by reason of the prior removal of the water and water soluble constituents from the exhaust gases.

Conversion of essentially all of the water and water soluble pollutants to liquid phase may be accomplished in one, two or several stages of cooling; preferably at least two stages of cooling are employed. The first stage precools the hot gases to about ambient temperature, e.g., suitably between about 65°F. and 100°F., depending on the temperature of readily available cooling water, such as river water or tap water at the system site. Further cooling of the gaseous combustion products then occurs by use of a refrigerant, such as a solution of 50% water and 50% methanol by volume, the temperature of the refrigerant suitably being about 25°-30°F., the refrigerating stage suitably cooling the combustion product gases to about 35°F., at which temperature essentially all of the water and water soluble pollutants are condensed into an aqueous liquid phase. The resulting aqueous liquid phase is then drawn off and the water soluble pollutants are neutralized and/or extracted so that the water can be returned to the environment without pollutive effect on the environment. The remaining gases, after removal of the water and water soluble pollutants, are preferably then passed through suitable adsorber means, such as a molecular sieve or the like, to remove water insoluble pollutants such as carbon monoxide.

Cooling and dewatering of the exhaust gases prior to passing them through the adsorber means markedly increases the life of the adsorber means. For example, it is estimated that at 300°–1000°F., the normal industrial exhaust gas temperature range, 100 pounds of adsorber will hold about 1 pound of adsorbed material, whereas at about 30°–60°F., 100 pounds of adsorber will hold about 10–20 pounds of adsorbed material. Further, adsorbers presently commercially available are inefficient in high moisture environment due to the fact that they rapidly become loaded with water. By cooling the gases and removing most of the water prior to passing the gases through the adsorber, the effective life of the adsorber is very substantially increased.

Another feature of the present invention is that by use of a refrigerated condensing stage, excellent control is available to determine selective removal of pollutants.

DESCRIPTION OF THE DRAWINGS

Typical systems for carrying out the invention are disclosed in the accompanying drawings, wherein FIG. 1 schematically portrays a prototype system involving two or three stages of condensation and one or two stages of gas/liquid separation; and FIG. 2 schematically shows a modified treatment system involving application of the present invention to a stationary power plant with steam cycle heat exchanger water being cooled in a cooling tower and with water condensate from the power plant products of combustion being employed as all or part of the cooling medium to cool the first heat exchanger stage, the water discharge from the heat exchanger being also passed to the cooling tower.

DESCRIPTION OF THE PREFERRED EMBODIMENTS

Figure 1:
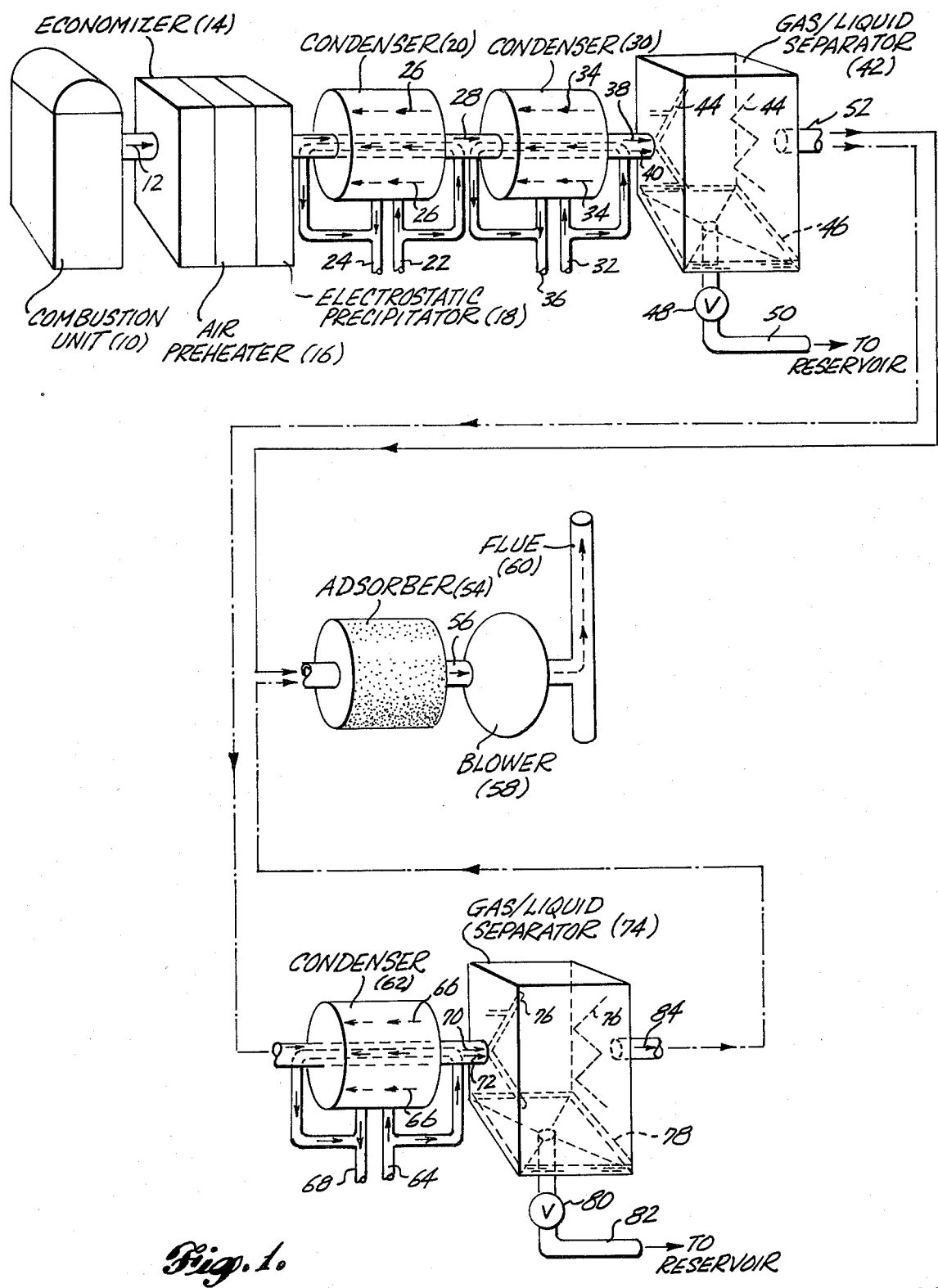

As shown in FIG. 1, a stationary combustion unit 10 such as a gasoline burning internal combustion engine, or such as a diesel oil or natural gas burning heating furnace, generates products of combustion exhausting from the unit, as indicated at 12. Typically the exhaust gases are then passed through an economizer 14, an air preheater 16, and an electrostatic precipitator 18, all of which are conventional per se.

Hot combustion products exhausting from the unit 10 are typically at a temperature from about 300° to about 1000°F. After leaving the electrostatic precipitator 18, the hot combustion products are passed through a first cooling stage in condenser 20, wherein they are cooled by water from a convenient environmental source, such as a water main, river, cooling tower or the like, the flow of the water into the condenser 20 being through inlet piping 22 and out of the condenser 20 by outlet piping 24. The temperature of the cooling water will be near ambient and, depending upon the source, can typically vary from about 35° to about 100°F. The cooling water, entering the condenser 20 through piping 22, courses the condenser 20 counter to the gas flow, as indicated by arrows 26. Suitable baffles, not shown, are provided in the condenser 20 to deflect the gas flow and produce more uniform cooling. The gas outflow from the condenser 20 is typically at a temperature about 10°F. higher than the coolant, e.g., if the coolant entering the inlet 22 is 55°F., the outflow gases are cooled to about 65°F.

After leaving the first stage condenser 20 the gas and liquid phases of the outflow, indicated at 28, are passed through a second stage condenser 30 which is typically of like construction as condenser 20 and cooled by a refrigerated coolant or the like, suitably a water-methanol (50:50) solution. The coolant enters the condenser 30 by inlet piping 32, suitably at a temperature from about 25° to about 30°F., having been refrigerated to such temperature by a refrigerating unit, not shown, in a manner conventional per se. In like manner as in condenser 20 the coolant also passes through the condenser 30 in a direction counter to the flow of the combustion products, as indicated by arrows 34, and leaves the condenser 30 by piping 36. The temperature of the gases and condensate exhausting from the condenser 30, as indicated by respective arrows 38 and 40, is at near-freezing temperature, i.e., about 35°F. For definition purposes the condensate and gases leaving the first stage condenser 20 are termable first intermediate exhaust products and the condensate and gases leaving the second stage condenser 30 are termable second intermediate exhaust products. The second intermediate exhaust products leaving the second stage condenser 30 include a large portion of the water generated by the combustion reaction in liquid phase, together with a large portion of the water soluble pollutants also in liquid phase. This liquid phase (condensate 40) is separated from the gaseous phase (effluent 38) portion of the condenser 30 outflow in a gas-liquid separator 42 in which suitable baffles 44 are provided to further separate the liquid phase from the gaseous phase in a manner conventional per se, the condensate outflow 40 and condensate forming on the baffles 44 and the interior walls of the separator 42 accumulate in the bottom of the separator 42 as indicated at 46, which accumulated aqueous liquid condensate 46 is withdrawn by opening of valve 48 in the condensate discharge conduit 50, such withdrawl occurring either from time to time or on a continuing basis as desired.

Discharge from the conduit 50 is to a suitable reservoir or other container, not shown, wherefrom the condensate may be treated or transferred to subsequent stages for further processing, such as to oxidize the formaldehyde and formic acid content thereof by addition of a reagent such as sodium hypochlorite. Other undesirable pollutants in the liquid condensate 46 can be neutralized by suitable reagents, and separated by precipitation and filtering or by ion exchange in a manner conventional per se. After such separation of the pollutants the resulting aqueous liquid can then be disposed of through the environmental sewage system or to a suitable drain field, for example.

In the system shown in FIG. 1 the dewatered exhaust gases, as third intermediate exhaust products, leave the separator 42 through discharge conduit 52, and are then passed to a suitable filter or adsorber means such as molecular sieve 54, in which water insoluble pollutants such as carbons monoxide are removed, the essentially pollutant-free gases at the outflow (designated by arrow 56) from the sieve 54 being exhausted by blower 58 to the atmosphere through flue stack 60.

Molecular sieve 54, in a manner known per se, can be regenerated by heating it in an oven at about 400°F. for example. The temperature of the regenerative cycle is determined by the properties of the material adsorbed. The gases eluded during the adsorber regeneration cycle are neutralized or extracted as by being forced through suitable scrubbers, in a manner conventional per se. A plurality (not shown) of molecular sieve 54 or the like can also be used in a turret arrangement, with one in use while the other or others are being regenerated as by passing hot gases through them from a suitable source such as the economizer 14. For example, a plurality of adsorbers 54 can be mounted on a turret or the like and brought "on line" successively.

As an alternative form of the invention, a second stage of refrigeration can be employed. For this purpose, as shown at the bottom of FIG. 1, a third condenser 62 is placed in the system after the gas-liquid separator 42 to receive the third intermediate exhaust products from a separator 42. The third condenser 62 is cooled by a suitable refrigerant such as a water-methanol (50:50) solution, and the temperature of this refrigerant is selected to be between about 10°F. to about 20°F. colder than the dew-point temperature of the desired condensate in the third intermediate exhaust products. The refrigerant enters condenser 62 by inlet piping 64 and passes counter to the gas flow therein as indicated by arrows 66, existing through piping 68. The liquid and gases outflow, respectively designated by arrows 70 and 72, are termable the fourth intermediate exhaust products. These products are passed from the third stage condenser 62 to a second gas-liquid separator 74 in which a liquid phase is separated from the gaseous phase by condensation of the liquid phase on baffles 76 and the liquid condensate, designated 78 accumulated in the separator 74 is drained from the separator through outlet valve 80 and outflow conduit 82, which delivers it to a reservoir or other container, not shown, in which the condensate 78 can be stored or treated in like manner as condensate 46 from separator 42, i.e., the condensed pollutants therein can be similarly neutralized or extracted by precipitation so that essentially pollutant-free water is discharged to the environment. The refrigerated nature of the essentially pollutant-free liquid evolving from the condensates 46 and 78, after separation of the water soluble pollutants therefrom, can also be utilized as the refrigerated heat exchange medium in the recycled water cooling condenser 20, as desired.

The gases leaving separator 74, as indicated at 84, are termable the fifth intermediate exhaust products, and are passed through a suitable filter or adsorber means such as sieve 54 prior to discharge to the atmosphere.

It is to be noted that only single stage refrigeration (as at condenser 30 and separator 42) is not feasible where condensation of pollutants is desired at a temperature below water freezing temperature because if water is not previously removed the water sould freeze in the condenser and in the subsequent gas-liquid separator. Accordingly, whether or not plural stages of pollutant separation by condensation are employed, it is essentially that the first separation occur at a temperature near the freezing temperature of water, since utilization of a below-freezing temperature renders the condensate solid and not readily handleable from the point of view of separation from the gaseous phase, and since separation temperatures substantially above the freezing temperature of water are relatively inefficient insofar as effective removal of water and water soluble pollutants from the gaseous phase. It is also notable that the entire system involves treatment of the hydrocarbon fuel combustion products while such products are at and remain at essentially ambient pressure, which mode of handling the combustion products avoids the relative complications inherent in prior gas/liquid separation systems involving selective pressurization or a combination of selective pressurization and selective temperature control to accomplish constituent separation.

FIG. 2 schematically illustrates a modified form of system and processing further characteristic of the invention. In this system a conventional power plant combustion chamber 100, comprising fuel oil fired or natural gas fired burners or the like, generates hot combustion products which are delivered to a steam generator or boiler 106, as indicated by arrows 104, the steam from the generator 106 passing, as indicated by arrow 108, through a steam driven turbine means 102 and being returned as indicated by arrows 110 and 112 for recirculation through the generator 106, such recirculation path including a heat exchanger 114 (commonly called a condenser) between the turbine means 102 and the steam generator 106. Heat exchanger 114 serves to cool the effluent from turbine means 102 to improve turbine efficiency, the heat exchange medium utilized in the heat exchanger 104 being cooling water recycled in a closed system through the heat exchanger 114 and a cooling tower 116. Hot water flow from heat exchanger 114 is through conduit 118 as indicated by arrows 120, 122 and cool water flow from the cooling tower 116 to the heat exchanger 114 is through conduit 124, as indicated by arrow 126.

As will be understood, the power generation system comprising the power plant combustion chamber 100, steam generator 106, turbine means 102, heat exchanger 114 and cooling tower 116 (i.e., all equipment to the left of broken line PP in FIG. 2) is conventional per se and of a type where it is common practice to simply discharge the somewhat cooled but still hot combustion products exhaust from steam generator 106 to the atmosphere.

In practice of the present invention, the hot combustion products discharged from the steam generator 106 are passed to a heat exchanger 130 through conduit 132 as indicated by arrow 134. In a typical system the temperature of the combustion products input to the heat exchanger 130 is about 500°F. and the combustion products are cooled in the heat exchanger 130 (in a manner more fully discussed below) to the extent that the temperature of the combustion products outflow from heat exchanger 130 (as designated by arrow 136) is about 80° to about 100°F.

The combustion products outflow from heat exchanger 130 is passed through conduit 138 to second heat exchanger 140 wherein the combustion products are cooled to about 30°–35°F., the cooling of the heat exchanger 140 being by refrigerated coolant recycled from a suitable source (not shown), the function and operation of heat exchanger 140 being directly comparable to the function and operation of second condenser stage 30 as more specifically discussed in connection with FIG. 1. The outflow from heat exchanger 140 has both gaseous phase and liquid phase constituents (comparable to outflow constituents 38 and 40 in FIG. 1) and is passed through conduit 142 to gas-liquid separator 144 which can suitably be constructed and function in like manner as gas-liquid separator 42 in FIG. 1. The condensed water and water soluble pollutant containing condensate accumulated in separator 144 is discharged through conduit 146, as indicated by arrow 148, to a three way valve 150, from whence the condensate is delivered either to treatment tank No. 1 (designated 152) or treatment tank No. 2 (designated 154), depending on the setting of the valve 150. The gaseous outflow from the separator 144 passes through conduit 156 to adsorber 158 which can be one or more molecular sieves functioning in like manner as discussed in connection with molecular sieve 54 in FIG. 1, to remove water insoluble pollutants such as carbon monixide. The essentially pollutant-free gas outflow from adsorber 158 is passed through conduit 160 to a flue stack or the like for discharge to the atmosphere.

The condensate delivered to the treatment tanks 1 and 2 is there appropriately processed to neutralize and/or precipitate whatever soluble pollutants occur, and it is to be recognized that the nature of these water soluble pollutants can vary depending upon the type of fuel combusted in combustion chamber 100. In a particular installation a succession of treatments is necessary to separate by precipitation or extraction each of the water soluble pollutants. The treated condensate is discharged from the on-stream tank outflow through three way valve 162 and conduit 164 to the precipitation/extraction means represented in FIG. 1 by centrifugal separator 166, in which the precipitates are removed as sludge 168, and one or more ion-exchange beds 169, known per se, in which non-precipitated water soluble pollutants such as nitrate and nitrite salts are removed. The cool liquid outflow ion exchange means 169 is delivered by conduit 170, as indicated by arrow 172, to refrigerated storage tank 174, from whence the cool liquid outflow is delivered through conduit 176 to the first heat exchanger 130, as indicated by arrow 178. Environmental cooling water at ambient temperature can also be delivered to conduit 176 from a suitable source as a water main, river or the like through the valve 182 and conduit 184 to conduit 176, as desired, and it will be recognized that the temperature of the outflow of combustion products from heat exchanger 130 is governed by the relative proportions and respective temperatures of the condensed and recycled water from refrigerating tank 174 and the ambient temperature cooling water introduced through valve 182. The water outflow from heat exchanger 130 is passed through conduit 186 to the cooling tower 116, as indicated by the arrow 188, and is there employed to supplement the cooling action of the cooling tower on the hot water return from condenser 114. There is no return of cooled water from the cooling tower 116 because the evaporation of water to the atmosphere in the cooling tower. As will be recognized, utilization of the relatively cool condensed water from refrigerating tank 174 through the heat exchanger 132 and the cooling tower 116 provides conservation of energy in the system.

Alternatively, if escape of water vapor to the atmosphere is to be minimized, cooling tower 116 can be dispensed with and the coolant(s) through heat exchangers 114 and 130 cooled by environmental water such as river water or the like, with indirect heat exchange with the refrigerated water in tank 174 if desired, followed by discharge of the tank 174 water to the environment.

In general, analyses of what pollutants occur and are to be removed in specific situations have indicated that where the fuel burned in natural gas the primary water soluble pollutants are formaldehyde, formic acid, hydrogen sulfide, sulfur dioxide and nitrogen oxices, and where the fuel burned is fuel oil or gasoline the primary pollutants in addition include certain organic nitrogens such as quinoline bases and pyridine bases, and that in each instance the significant water insoluble pollutant is carbon monoxide. As will be understood, presented certain specific water soluble pollutants in determined amounts in aqueous solution in treatment tanks 152 and 154, the techniques for precipitation or extraction of the pollutants to separate such from the liquid condensate can be determined by application of chemical processing techniques known per se. For example, assuming the fuel utilized in the power plant is natural gas, the treatment which occurs in the on-stream treatment tank 1 or 2, as the case may be, can involve addition of a suitable oxidizer such as sodium hypochlorite to oxidize the contained formaldehyde and formic acid, with lead acetate or the like being added after the hypochlorite addition to neutralize excess chlorine. If any $SO_2$ and $H_2S$ remain unprecipitated after the lead acetate addition, they can then be precipitated by addition of calcium hydroxide (lime) or the like. Combined forms of $NO_x$ are removed by cation and/or anion exchange as in one or more beds (169) in a manner known per se. Assuming the fuel utilized in the power plant is fuel oil or gasoline, the water soluble pollutants may also include quinoline type and pyridine type bases which are converted to precipitant products by the sodium hypochlorite and lead acetate additions.

What is claimed is:

1. The method of generating and treating combustion product type industrial exhaust gases to remove water soluble atmosphere pollutants therefrom, said method comprising:
   a. generating the exhaust gases under conditions evolving the products in hot gaseous form;
   b. cooling the hot combustion products to about 35°F. at substantially atmospheric pressure to condense the contained water and convert water soluble pollutants including any formaldehyde, formic acid, hydrogen sulfide, sulfur dioxide, oxides of nitrogen, quinoline bases and pyridine bases to aqueous liquid phase as solutes in the condensed water;
   c. separating the condensed water and its solutes from the remaining gases; and
   d. discharging at least most of the remaining gases to the atmosphere.

2. The method of removing atmosphere pollutants from combustion products generated by combustion of hydrocarbon fuels, said method comprising:
   a. generating hot gaseous combustion products under conditions wherein the gaseous combustion products include carbon dioxide and water as the principal products of combustion and also include trace amounts of various water soluble pollutants, including formaldehyde, formic acid, hydrogen sulfide, sulfur dioxide, oxides of nitrogen, quinoline bases and pyridine bases pollutants;
   b. cooling the hot combustion products to about 35°F. at substantially atmospheric pressure to condense the water and convert such water soluble pollutants to aqueous liquid phase as solutes in the condensed water;
   c. separating the condensed water and its solutes from the remaining gases; and
   d. discharging at least most of the remaining gases to the atmosphere.

3. The method of claim 2, further comprising separating at least some of the water soluble pollutants in the condensed water.

4. The method of claim 2, further comprising separating at least some of the pollutants from the condensed water and removing additional pollutants from the remaining gases prior to discharge thereof to the atmosphere.

5. The method of claim 4, further including the steps of extracting or neutralizing at least some of the water soluble pollutants in the separated aqueous liquid phase and removing additional pollutants from the remaining gases prior to discharge thereof to the atmosphere.

6. The method of treating gaseous combustion products including principally carbon dioxide and water and also material amounts of water soluble pollutants, including formaldehyde, formic acid, hydrogen sulfide, sulfur dioxide, oxides of nitrogen, quinoline bases and pyridine bases, to remove said pollutants therefrom, comprising:
   a. cooling the combustion products to a temperature between about 60° and about 100°F. by using water from a convenient source, to form first intermediate exhaust products, a portion of said exhaust products being condensed to liquid phase;
   b. cooling the first intermediate exhaust products by using a first refrigerated coolant to form second intermediate exhaust products the temperature of which is about 35°F., a further portion of said second intermediate exhaust products being condensed into liquid phase;
   c. separating the liquid portion of the second intermediate exhaust products, leaving third intermediate exhaust products;
   d. removing selected pollutants from said liquid portion; and
   e. removing selected pollutants from the third intermediate exhaust products.

7. The method defined by claim 6, wherein the step of removing selected pollutants from the third intermediate exhaust products includes filtering or adsorbing the selected products.

8. The method defined by claim 6, further including the steps of further cooling the third intermediate exhaust products with a second refrigerated coolant at a temperature lower than the temperature of the first refrigerated coolant to form fourth intermediate exhaust products, a portion of which is condensed into liquid phase; separating the liquid portion of the fourth intermediate products, leaving fifth intermediate exhaust products; and then filtering or adsorbing selected pollutants from the fifth intermediate exhaust products.

9. The method defined by claim 7, wherein the liquid portion includes formaldehyde and formic acid which are oxidized with a hypochlorite, with the hydrogen sulfide, sulfur dioxide, oxides of nitrogen, quinoline base and pyridine base pollutants in the liquid phase being precipitated or neutralized by suitable reagents.

10. The method defined by claim 8, wherein the liquid portion includes formaldehyde and formic acid which are oxidized with a hypochlorite, with hydrogen sulfide, sulfur dioxide, oxides of nitrogen, quinoline base and pyridine base pollutants in the liquid portion being precipitated or neutralized by suitable reagents.

11. The method of claim 8, wherein said first refrigerated coolant is at a temperature between about 25° and about 30°F.

12. The method of claim 8, wherein said second refrigerated collant is at a temperature less than about 20°F.

13. The method of burning a hydrocarbon fuel and treating the combustion products thereof to remove atmosphere pollutants from such combustion products, said method comprising:
   a. generating such combustion products under conditions wherein the combustion products are in hot gaseous form at substantially atmospheric pressure and include carbon dioxide and water as the principal products of combustion and also include material amounts of various water soluble pollutants, including formaldehyde, formic acid, and oxides of nitrogen;

b. cooling the hot combustion products to about 35°F. at substantially atmospheric pressure to convert most of the water and most of said pollutants to aqueous liquid phase;

c. separating the aqueous liquid phase of the cooled combustion products from the remaining gases; and d. discharging at least most of the remaining gases to the atmosphere.

* * * * *